United States Patent [19]

Sack et al.

[11] Patent Number: 4,515,897
[45] Date of Patent: May 7, 1985

[54] CRYSTALLIZING GLASS SOLDERS AND STRIPPING FILMS WITH SUCH GLASS SOLDER IMPRINTED THEREON

[75] Inventors: Werner Sack; Werner Kiefer, both of Mainz, Fed. Rep. of Germany

[73] Assignee: Schott Glaswerke, Mainz, Fed. Rep. of Germany

[21] Appl. No.: 572,998

[22] Filed: Jan. 23, 1984

[30] Foreign Application Priority Data

Jan. 28, 1983 [DE] Fed. Rep. of Germany ....... 3302774
Jan. 28, 1983 [DE] Fed. Rep. of Germany ... 8302243[U]

[51] Int. Cl.$^3$ ........................ C03C 7/02; C03C 3/22; C03C 3/10; C03C 3/04
[52] U.S. Cl. .......................................... 501/15; 501/4; 501/7; 501/22; 501/23; 501/59; 501/61; 501/62; 501/66; 501/75; 501/77
[58] Field of Search ................... 501/15, 22, 23, 4, 7, 501/75, 59, 61, 62, 77, 66

[56] References Cited

U.S. PATENT DOCUMENTS 3,463,647  8/1969  Kosiorek et al. ..................... 501/7
3,503,763  3/1970  Mills ..................................... 501/7
3,907,577  9/1975  Kiefer et al. ......................... 501/4

*Primary Examiner*—Helen M. McCarthy
*Attorney, Agent, or Firm*—Wegner & Bretschneider

[57] ABSTRACT

Partially crystallizing glass solders, and stripping films using them as agents to be transferred, which are sintered at temperatures below 900° C. from glass powder with granulation of less than <150 μm, thereafter exhibiting thermal expansion coefficients of $-23.5$ to $34.3 \cdot 10^{-7} \cdot K^{-1}$, whose crystallization temperature lies below 710° C. and whose crystal phase consists predominantly of h-quartz mixed crystal phase exhibiting the following composition (in weight %): 23–44 $SiO_2$, 20–37 $Al_2O_3$, 5.5–11 $Li_2O$; 3–20 $B_2O_3$; 0–36 PbO; 0–1 $Na_2O$; 0–1.5 $K_2O$; 0–0.1 F; 0–4 $TiO_2$; 0–3.5 MgO; 0–2 CoO, provided $B_2O_3 + PbO + Na_2O + K_2O + F + TiO_2$ is 8.5–50.0.

5 Claims, 5 Drawing Figures

CRYSTALLIZING GLASS SOLDERS AND STRIPPING FILMS WITH SUCH GLASS SOLDER IMPRINTED THEREON

FIELD OF THE INVENTION

This invention relates to partially crystallizing glass solders which, in powder form, are suitable for low fusion tension and mechanically strong bonding of materials with thermal expansions of $-5$ to $+33 \cdot 10^{-7} \cdot K^{-1}$ in the temperature range of 20°–500° C. such as quartz glass, transparent glass ceramics containing h-quartz mixed crystals, opaque glass ceramics containing h-spodumenes as well as borosilicate glasses, e.g., of the DURAN 50 type with an $\alpha$-value in the range of 20°–300° C. of $33 \cdot 10^{-7} \cdot K^{-1}$.

SUMMARY AND DESCRIPTION OF THE INVENTION

Figure 1:
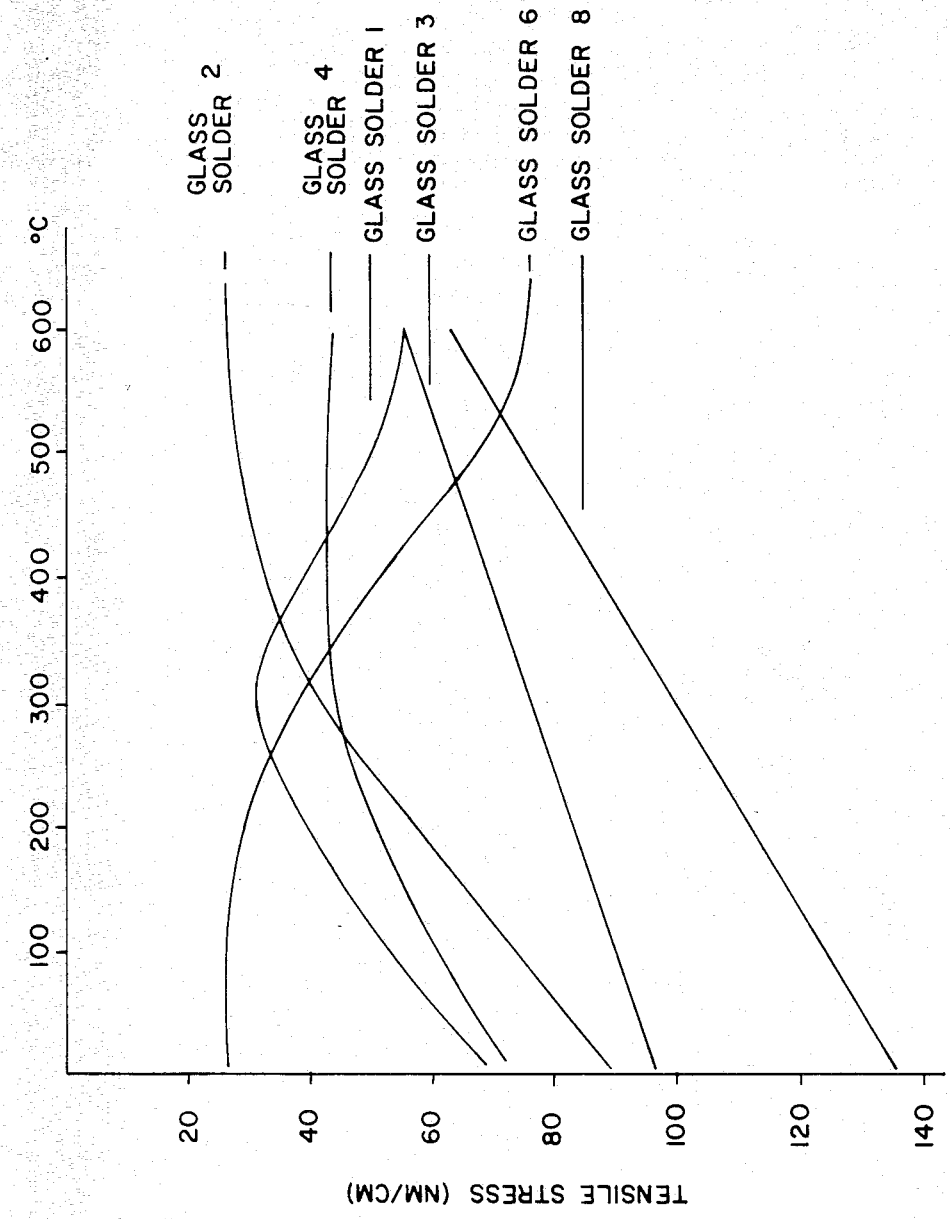
FIG. 1 is a graph depicting the temperature dependency of the tensile stresses within the interior of fusion partners for glass solders 1 through 4 and 8.

The glass crystal compositions consist of 50–90 weight percent of the h-quartz mixed crystal phase of the system $Li_2O$—$Al_2O_3$—$SiO_2$ and 10–50 weight percent of the glass phase of components not integrated into the h-quartz mixed crystal lattice such as boric acid ($B_2O_3$), lead oxide (PbO), sodium oxide ($Na_2O$), potassium oxide ($K_2O$), fluorine (F) and an amount of a nucleation agent up to 4 weight percent of titanium oxide ($TiO_2$). In addition, the soldering glasses can contain up to 2 percent magnesium oxide (MgO) and cobalt oxide (CoO) forming mixed crystal. A $B_2O_3$ content of at least 3 weight percent, preferably >5.0 weight percent, proved to be a prerequisite for a technically suitable bonding strength of such a fusion (soldering).

By means of the glass phase portion it is possible during the melting process between 1420° and 1300° C. to stabilize the pure h-quartz mixed crystal composition with the mole-ratio $Li_2O:Al_2O_3:SiO_2 = 1:1:2$; i.e. 11.86 weight percent $Li_2O$, 40.46 weight percent $Al_2O_3$, 47.68 weight percent $SiO_2$, which has a strong tendency toward crystallization, so that the solders can be melted in a homogeneous glassy state and be processed to glass powder.

A granulation of <100 $\mu m$, preferably <20 $\mu m$, has proven to be effective for soldering. The glass solder powders are used either in paste form or as a 10 to 250 $\mu m$, preferably 25 to 100 $\mu m$, screen printing layer for the soldering process.

The invention generally relates to a partially crystallizing glass solder which exhibits, after having been sintered at a temperature lower than 900° C., preferably lower than 850° C., from glass powder smaller than 100 $\mu m$, thermal expansion coefficients in the range of 20°–500° C. from $-23.5$ to $34.3 \cdot 10^{-7} \cdot K^{-1}$, differential thermoanalysis peak$_{max}$ temperatures (at a heating rate of 2.7 K/min or 6 K/min) lying below 710° C. and crystal phases consisting predominantly of h-quartz mixed crystal phase, and which contain, calculated as oxide weight percents, 23.0–44.0 Wt. % $SiO_2$, 20.0–37.0 Wt. % $Al_2O_3$, 5.5–11.0 Wt. % $Li_2O$, 3.0–20.0 Wt. % $B_2O_3$, 0–36.0 Wt. % PbO, 0–1.0 Wt. % $Na_2O$, 0–1.5 Wt. % $K_2O$, 0–0.1 Wt. % F, 0–4.0 Wt. % $TiO_2$, 0–3.5 Wt. % MgO, 0–2.0 Wt. % CoO and 8.5–50.0 Wt. % in total of the combination of $B_2O_3$, PbO, $Na_2O$, $K_2O$, F and $TiO_2$. All of the solders according to this invention may contain small amounts of unavoidable impurities.

The glass solders of this invention which are preferably suitable for soldering quartz glass, transparent and opaque glass ceramics in the $SiO_2$—$Al_2O_3$—$Li_2O$ system, exhibit in the sintered crystalline state thermal expansion coefficients in the range of 20°–500° C. from $-23.5$ to $+26 \cdot 10^{-7} \cdot K^{-1}$, differential thermoanalysis peak$_{max}$ temperatures (at a heating rate of 2.7 K/min) lying below 700° C. and crystal phases consisting predominantly of h-quartz mixed crystal phase, and contain, calculated as oxide weight percents, 35.0–44.0 Wt. % $SiO_2$, 30.0–37.0 Wt. %, $Al_2O_3$, 8.5–11.0 Wt. % $Li_2O$, 3.0–10.0 Wt. % $B_2O_3$, 0–15.0 Wt. % PbO, 0–1.0 Wt. % $Na_2O$, 0–0.65 Wt. % $K_2O$, 0–0.1 Wt. % F, 0–4.0 Wt. % $TiO_2$, 0–2.0 Wt. % MgO, and 8.5–25.0 Wt. % in total of the combination of $B_2O_3$, PbO, $Na_2O$, $K_2O$, F and $TiO_2$.

One solder which is preferable for use in soldering the transparent glass ceramic ZERODUR, for example, exhibits in the sintered crystalline state a progression of the thermal expansion coefficient in the range of 20°–500° C. from $-5.3$ over $-0.7$ to $+13.3 \cdot 10^{-7} \cdot K^{-1}$, a differential thermoanalysis peak$_{max}$ temperature lying at 687° C., the crystalline phase consisting predominantly of h-quartz mixed crystal, and having a fusion tension in ZERODUR lying between 180 and 210 nm/cm of pressure tension, the tensile strength being greater than 15 N/mm$^2$ and the modulus of elasticity lying between 10,000 and 20,000 N/mm$^2$. This solder consists essentially of, calculated as oxide parts by weight, 43.71 parts $SiO_2$, 35.43 parts $Al_2O_3$, 10.17 parts $Li_2O$, 8.95 parts $B_2O_3$, 1.60 parts PbO, 0.04 parts $Na_2O$, 0.10 parts F, 4.00 parts $TiO_2$, making a total of 104.00 parts by weight.

Another glass solder which is preferably suitable for the soldering of borosilicate glasses of the DURAN 50 type exhibits in the sintered crystalline state at a maximum of 680° C. thermal expansion coefficients in the range of 20°–400° C. from 11.9 to $34.3 \cdot 10^{-7} \cdot K^{-1}$, differential thermoanalysis peak$_{max}$ temperatures (at a heating rate of 6 K/min) lying below 710° C. and a crystalline phase consisting predominantly of h-quartz mixed crystal phase together with somewhat lesser proportions of an unknown second crystalline phase (that is, it shows two differential thermoanalysis peaks). This solder contains, calculated as oxide weight percents, 23.00–29.00 Wt. % $SiO_2$, 20.00–25.00 Wt. % $Al_2O_3$, 5.90–7.00 Wt. % $Li_2O$, 10.00–20.00 Wt. % $B_2O_3$, 12.50–36.00 Wt. % PbO, 0–1.50 Wt. % $K_2O$, 4.00 Wt. % $TiO_2$, 0–3.50 Wt. % MgO, 0–2.00 Wt. % CoO and 40.00–50.00 Wt. % in total of the combination of $B_2O_3$, PbO, $K_2O$ and $TiO_2$.

A particularly preferable embodiment of this glass solder, preferably suitable for the soldering of DURAN 50 glass, exhibits in the sintered crystalline state a change of the thermal expansion coefficient in the range of 20°–400° C. from 18.9 to $29.4 \cdot 10^{-7} \cdot K^{-1}$, the fusion tension in a 5-layer soldering test using this solder corresponds to the curve progression shown in drawing FIG.

3, and the tensile strength of this soldering is >15 N/mm². This solder consists essentially of, calculated as oxide weight percents, 28.70 Wt. % SiO$_2$, 24.30 Wt. % Al$_2$O$_3$, 7.00 Wt. % Li$_2$O, 20.00 Wt. % B$_2$O$_3$, 14.00 Wt. % PbO, 4.00 Wt. % TiO$_2$ and 2.00 Wt. % MgO.

The invention of this application also encompasses the use of the glass solder as described herein to solder various glasses, particularly quartz glass, and transparent and opaque glass ceramics in the SiO$_2$—Al$_2$O$_3$—LiO system. The soldering may take place using a pressure greater than 500 g/cm² on the soldered surface and the soldering may be carried out on hollow bodies where the soldering pressure is produced by the use of a vacuum within the hollow body itself. The soldering may take place below 900° C., and preferably below 850° C.

The glass solders according to this invention may also be used as elements of a stripping film, which comprises a backing of a coated paper and a layer of an agent applied by means of an adhesive, preferably a water-soluble adhesive, in which the agent to be transferred to another object is a glass solder, a crystallizing glass solder, a partially crystallized glass solder or a mixture of these materials. The agent to be transferred by the stripping film may be applied to the film by means of screen printing, offset printing or a combined screen/offset printing in a predetermined thickness. The agent to be transferred is particularly a partially crystallizing glass solder whose crystal phase consists predominantly of h-quartz mixed crystals, and which consists essentially of, calculated as oxide weight percent, 23.0–44.0 Wt. %, SiO$_2$, 20.0–37.0 Wt. % Al$_2$O$_3$, 5.5–11.0 Wt. % Li$_2$O, 3.0–20.0 Wt. % B$_2$O$_3$, 0–36.0 Wt. % PbO, 0–1.0 Wt. % Na$_2$O, 0–1.5 Wt. % K$_2$O, 0–0.1 Wt. % F, 0–4.0 Wt. % TiO$_2$, 0–3.5 Wt. % MgO and 0–2.0 Wt. % CoO.

The soldering process comprises the following stages:
vaporization of the paste solvent,
nucleation of the h-quartz mixed crystal phase,
sintering or soldering and crystallization of the h-quartz mixed crystal phase in the system Li$_2$O—Al$_2$O$_3$—SiO$_2$.

Evaporation of the solvent takes place during the heating process below 500° C. Nucleation and crystallization take place between 550° and 850° C. A longer holding time at temperatures above 650° C. in the case of borosilicate glasses and 780° C. with quartz and glass ceramics serves for soldering or sintering.

Two characteristic programs for soldering of transparent glass ceramics containing h-quartz mixed crystals, e.g., ZERODUR are:

Program I:

$$RT \xrightarrow{10 \text{ K/min}} 500° C. \xrightarrow{2.2 \text{ K/min}} 850° C.,$$

$$2 \text{ h const.} \xrightarrow{2 \text{ K/min}} 600° C. \xrightarrow{10 \text{ K/min}} RT.$$

(RT=room temperature)

Program II:

$$RT \xrightarrow{4 \text{ K/min}} 500° C. \xrightarrow{4.8 \text{ K/h}} 820° C.,$$

$$5 \text{ h const.} \xrightarrow{4.8 \text{ K/h}} 600° C. \xrightarrow{10 \text{ K/h}} RT.$$

Program III has proved effective for borosilicate glass soldering:

$$RT \xrightarrow{\text{furnace curve}} 500° C. \xrightarrow{2 \text{ K/min}} 680° C.,$$

$$1 \text{ h const.} \xrightarrow{2 \text{ K/min}} 450° C. \xrightarrow{\text{furnace curve}} RT.$$

In the case of fusion processes for transparent glass ceramics, which take place below 850° C., it is advantageous to carry out the soldering under pressure. It has been observed that a pressure of ≧500 g/cm² substantially enhances the mechanical strength of the soldering. The pressure can be achieved by exterior stress as well as by the application of a vacuum in the case of hollow bodies. The soldering process must be carried out at temperatures below 900° C., since the h-quartz mixed crystal is converted into spodumenes having 900° C. For a mechanically tight borosilicate bond a soldering under pressure has shown itself to be effective. Testing of the strength of each solder is performed with L-shaped fusion samples stressed above a bending stress to breaking. Strength values of 10–24 N/mm² result for suitable solders.

The stresses which can occur in the solder layer and in the fusion partner consist of diffusion stresses and/or fusion stresses. The diffusion stresses are brought about by an ion exchange between the solder and the fusion partner. The magnitude of the diffusion stress and the depth of the stress layer are, as is known, dependent on the differing chemical potential of the two bond partners, the temperature and the diffusion time. In the case of not overly long diffusion times (hour), with solder layers of ≧100 μm, the diffusion stress profiles are independent of the thickness of the solder layer. The magnitude of the fusion stress is determined by the thermal expansion differences of the fusion partners in the fusion zone and the "transition temperature," which can be equated with the Tg temperature of the solder as a first approximation at slow cooling. The diffusion stress, as a rule, can be easily measured since after a brief tempering period of a few hours (e.g. according to Program I), the diffusion layer is only a few μm (5–100 μm) thick. The stress occurring in this thin diffusion layer is usually greater than the fusion stress. As a result, the stress in the diffusion layer can be equated with the diffusion stress.

The glass solder 1 of Table 1 produces in the surface layer of ZERODUR, in case of a tempering according to Program I in a layer thickness of 30 μm, a pressure tempering of 2,500 nm/cm or 83 N/mm². In contrast to such fusion stresses, diffusion pressure stresses are desirable in the surface layer of the fusion partner, since they enhance the mechanical strength of the fusion.

The fusion stress can be determined only indirectly in the presence of the diffusion stress. For this purpose, two 1 mm thick samples of the fusion partners (e.g. ZERODUR) are provided on each side with a solder layer. One of the two samples is provided with 100 μm and the other with a 200 μm thick solder layer and tempered according to Program I. After taking into account the diffusion stress there results for the fusion stress, with the 100 μm sample, a pressure stress of 40 nm/cm and with the 200 μm sample of 80 nm/cm over the entire breadth of 1 mm. Relative to the same thickness of solder and fusion partner (ZERODUR), this means a fusion stress of 200 nm/cm or 6.7 N/mm².

The temperature dependence of the stresses generated during soldering is of great importance in the case of optical applications, e.g. for telescope mirrors. The temperature dependencies of the stresses within the interior of the fusion partner (ZERODUR) are represented for the glass solders 1 through 4,6 and 8 in FIG. 1. FIG. 2a shows the test samples used for this purpose. A 1×10×10 mm thick ZERODUR platelet (1) is soldered on both sides with solder layers (3) of over 60 to 80 μm thick to two 0.5×10×10 mm large ZERODUR platelets (2); (4) indicates the direction of measurement.

The following are significant for the evaluation and choice of the solders:

1. Sufficient crystallization stability during the fusion, so that the solders can be produced in the glassy state.

2. The devitrification characteristic of the glass solder, determined by means of differential thermoanalysis (DTA) on powder <20 μm, a a heating rate of 2.7 K/min for the glass ceramic and quartz glass solders and 6 K/min for the borosilicate glass solders. Qualitative information on the crystallization behavior is obtained from the peak$_{max}$, the peak height and the peak surface.

3. The termal expansion coefficient of the crystallized solder after the fusion process. For this purpose glass powder <20 μm is moistened with distilled water and pressed to a rod 125×12×10 mm and sintered in accordance with the above mentioned Program I. From this, the individual thermal expansion coefficients in the range of 50°-500° C. are determined, as is the crystal phase content of the samples by X-ray.

4. For the strength of the bond, an L-sample is produced. The vertical arm is firmly clamped and the horizontal arm stressed. The solder binding the vertical and horizontal arms should exhibit a fusion strength of >10N/mm$^2$, preferably >15N/mm$^2$. The rupture generally occurs in the fusion partner and not in the solder layer.

It is of decisive importance in the composition range of the solders for the transparent glass ceramics, that the h-quartz mixed crystal phase should always crystallize out during the fusion process, this being well known to have a heavily negative thermal expansion. For the PbO-richer borosilicate glass solders, an additional unknown Pb-silicate phase occurs. With respect to the positive thermal expansion of the variable glass phase occurring simultaneously, the thermal expansion of these partially crystallizing solders can thus be modified in both positive and negative directions.

For the suitability as fusion solder for transparent glass ceramics with h-quartz mixed crystal phase (ZERODUR), the low maximal crystallization temperature of <700° C.—determined as a peak$_{max}$ from the differential thermoanalysis—is an absolute requirement. At higher fusion temperatures >900° C. the h-quartz mixed crystal phase would rearrange into h-spodumenes and thus bring about opacity and an increase in the thermal expansion coefficients of the fusion partner.

From this it can be seen that these solders are suitable at the same time for bonding of materials such as quartz glass and opaque glass ceramics containing h-spodumenes with thermal expansion coefficients of about +6 to +20·10$^{-7}$·K$^{-1}$ in the temperature range of 20°-500° C.

In Table 1 which follows, nine composition examples are indicated and in Table 2 the significant properties of these solders which characterize the suitable composition range of the glass ceramic and quartz glass solders as follows:

| | |
|---|---|
| SiO$_2$ | 35.77–43.71 Wt. %, |
| Al$_2$O$_3$ | 30.34–36.50 Wt. %, |
| Li$_2$O | 8.89–10.60 Wt. %, |
| B$_2$O$_3$ | 3.00–10.00 Wt. %, |
| PbO | 0–15.00 Wt. %, |
| Na$_2$O | 0–1.00 Wt. %, |
| K$_2$O | 0–0.65 Wt. %, |
| F | 0–0.10 Wt. %, |
| MgO | 0–2.00 Wt. %, |
| TiO$_2$ | 0–4.00 Wt. %, |
| B$_2$O$_3$ + PbO + Na$_2$O + K$_2$O + F + TiO$_2$ | 8.50–25.00 Wt. %. |

TABLE 1

| Components | Weight Percent Composition Examples 1-9 | | | | | | | | |
|---|---|---|---|---|---|---|---|---|---|
| | 1 | 2 | 3 | 4 | 5 | 6 | 7 | 8 | 9 |
| SiO$_2$ | 43.71 | 42.90 | 42.90 | 42.90 | 38.20 | 38.20 | 43.70 | 42.90 | 35.77 |
| Al$_2$O$_3$ | 35.43 | 35.00 | 36.50 | 36.50 | 32.40 | 32.40 | 35.42 | 34.50 | 30.34 |
| Li$_2$O | 10.17 | 10.60 | 10.60 | 10.60 | 9.40 | 9.40 | 10.17 | 10.60 | 8.89 |
| B$_2$O$_3$ | 8.95 | 10.00 | 8.50 | 10.00 | 3.00 | 6.00 | 8.95 | 8.50 | 6.00 |
| PbO | 1.60 | 0.75 | | | 13.00 | 10.00 | 1.00 | | 15.00 |
| Na$_2$O | 0.04 | | | 1.00 | | | | | |
| K$_2$O | | | | | | | | 0.65 | |
| F | 0.10 | | | | | | | | |
| MgO | | | 0.75 | 1.50 | | | | 2.00 | |
| TiO$_2$ | 4.00 | | | 4.00 | 4.00 | 4.00 | 4.00 | 1.50 | 4.00 |
| Percent Total | 104.00 | 100.00 | 100.00 | 105.00 | 100.00 | 100.00 | 104.00 | 100.00 | 100.00 |

TABLE 2

| Properties | Properties of Glass Solders of Table 1 | | | | | | | | |
|---|---|---|---|---|---|---|---|---|---|
| | 1 | 2 | 3 | 4 | 5 | 6 | 7 | 8 | 9 |
| (in glassy state) | | | | | | | | | |
| α · 10$^7$ (20–300° C.)/°C. | 72.1 | 74.0 | 73.0 | 76.8 | | | 72.9 | 74.4 | 75.3 |
| TG (°C.) | 542 | 536 | 550 | 537 | | | 545 | 531 | 509 |
| Density (g/ccm) | 2.456 | 2.410 | 2.424 | 2.427 | | | 2.443 | 2.430 | 2.768 |
| in sintered crystalline state | | | | | | | | | |
| α · 10$^7$ (20–50° C.)/°C. | −5.3 | −2.78 | −6.72 | −0.60 | +1.2 | −0.3 | −14.1 | −6.2 | +4.77 |
| (20–100° C.)/°C. | −4.5 | −3.05 | −6.84 | −0.80 | +3.1 | +2.6 | −17.1 | −23.5 | +8.33 |
| (20–150° C.)/°C. | −1.4 | −0.80 | −4.22 | +2.50 | +5.1 | +5.1 | −11.6 | −19.6 | +11.06 |
| (20–200° C.)/°C. | +0.7 | +1.43 | −1.36 | +5.90 | +7.1 | +7.5 | −7.0 | −14.3 | +13.17 |

TABLE 2-continued

| Properties | Properties of Glass Solders of Table 1 | | | | | | | | |
|---|---|---|---|---|---|---|---|---|---|
| | 1 | 2 | 3 | 4 | 5 | 6 | 7 | 8 | 9 |
| (20–250° C.)/°C. | +3.6 | +3.25 | +0.97 | +8.80 | +9.1 | +9.4 | −3.3 | −10.3 | |
| (20–300° C.)/°C. | +4.2 | +5.11 | +2.96 | +11.10 | +10.8 | +10.8 | +0.02 | −7.4 | +16.06 |
| (20–400° C.)/°C. | +8.1 | +7.28 | +5.57 | +14.40 | +12.4 | +13.1 | +5.6 | +0.7 | +18.02 |
| (20–500° C.)/°C. | +13.3 | +13.69 | +8.83 | +22.90 | +16.4 | +16.4 | +13.6 | +6.9 | +25.88 |
| E-modulus (N/mm$^2$) | 12000 | 11900 | 12500 | | | | | | |
| DTA | | | | | | | | | |
| Peak$_{max}$ (°C.) | 687 | 678 | 679 | 661 | 658 | 660 | 685 | 611 | 638 |
| Peak height (mm) | 56 | 23 | 22 | 60 | 85 | 90 | 62 | 72 | 84 |
| Peak surface (mm$^2$) | 1070 | 676 | 680 | 880 | 1700 | 1510 | 1020 | 1625 | 1520 |
| Crystal phase content | h-Quartz-MK (84%) + unknown Phase | h-Quartz-MK (86%) + unknown Phase | h-Quartz-MK (85%) + unknown Phase | h-Quartz-MK (87%) + unknown Phase | h-Quartz-MK (78%) + unknown Phase | h-Quartz-MK (90%) + unknown Phase | h-Quartz-MK (89%) + unknown Phase | h-Quartz-MK (92%) + unknown Phase | h-Quartz-MK (89%) + unknown Phase |
| Strength of ZERODUR Solderings (N/mm$^2$) | 17.2 18.0 | 19.9 17.7 17.5 | 21.6 22.4 17.9 | 23.0 17.9 19.5 | 23.3 22.0 | 22.0 14.1 | 20.9 17.0 16.9 | 22.2 20.3 23.6 | 21.4 21.8 |

Table 3 contains the composition examples 10–17 of partially crystallizing solders for borosilicate glass with an α-value of $33 \cdot 10^{-7} \cdot K^{-1}$ in the range of 20°–300° C. In Table 4 are indicated the most important properties of these solders. The most favorable composition range for these solders has proven to be as follows:

| | |
|---|---|
| SiO$_2$ | 23.85–28.70 Wt. %, |
| Al$_2$O$_3$ | 20.25–24.30 Wt. %, |

-continued

| | |
|---|---|
| Li$_2$O | 5.90–7.00 Wt. %, |
| B$_2$O$_3$ | 10.00–20.00 Wt. %, |
| PbO | 12.50–36.00 Wt. %, |
| K$_2$O | 0–1.50 Wt. %, |
| TiO$_2$ | 4.0 Wt. %, |
| MgO | 0–3.50 Wt. %, |
| CoO | 0–2.00 Wt. %, |
| B$_2$O$_3$ + PbO + Na$_2$O + K$_2$O + F + TiO$_2$ | 40.00–50.00 Wt. %. |

TABLE 3

| | Weight Percent Composition Examples 10–17 | | | | | | | |
|---|---|---|---|---|---|---|---|---|
| Components | 10 | 11 | 12 | 13 | 14 | 15 | 16 | 17 |
| SiO$_2$ | 28.70 | 28.70 | 23.85 | 28.70 | 28.70 | 28.70 | 28.70 | 28.70 |
| Al$_2$O$_3$ | 24.30 | 24.30 | 20.25 | 24.30 | 24.30 | 24.30 | 24.30 | 24.30 |
| Li$_2$O | 7.00 | 7.00 | 5.90 | 7.00 | 7.00 | 7.00 | 7.00 | 7.00 |
| B$_2$O$_3$ | 10.00 | 20.00 | 10.00 | 10.00 | 20.00 | 20.00 | 20.00 | 20.00 |
| PbO | 26.00 | 16.00 | 36.00 | 25.00 | 14.00 | 12.50 | 12.50 | 12.50 |
| K$_2$O | | | | 1.00 | | 1.50 | | |
| TiO$_2$ | 4.00 | 4.00 | 4.00 | 4.00 | 4.00 | 4.00 | 4.00 | 4.00 |
| MgO | | | | | 2.00 | 2.00 | 3.50 | 1.50 |
| CoO | | | | | | | | 2.00 |
| Percent Total | 100.00 | 100.00 | 100.00 | 100.00 | 100.00 | 100.00 | 100.00 | 100.00 |

TABLE 4

| Properties | Properties of Glass Solders of Table 3 | | | | | | | |
|---|---|---|---|---|---|---|---|---|
| | 10 | 11 | 12 | 13 | 14 | 15 | 16 | 17 |
| (in glassy state) | | | | | | | | |
| α · 10$^7$ (20–300° C.)/°C. | 78.1 | 71.2 | 78.0 | 79.2 | 70.5 | 73.8 | 70.7 | 70.5 |
| TG (°C.) | 463 | 467 | 457 | 453 | 478 | 469 | 479 | 478 |
| Density (g/ccm) | 3.046 | 2.725 | 3.116 | 3.020 | 2.711 | 2.676 | 2.697 | 2.711 |
| in sintered crystalline state | | | | | | | | |
| α · 10$^7$ (20–50° C.)/°C. | 11.9 | 15.5 | 14.2 | 14.2 | 18.9 | 13 | 15.4 | 14.8 |
| (20–100° C.)/°C. | 14.4 | 17.9 | 17.2 | 15.7 | 19.8 | 22.8 | 20.7 | 19.4 |
| (20–150° C.)/°C. | | | | | | 25.5 | 23.1 | 21.8 |
| (20–200° C.)/°C. | 19.8 | 22.1 | 22.7 | 20.5 | 24.2 | 27.8 | 25.3 | 24.0 |
| (20–250° C.)/°C. | | | | | | 29.6 | 27.0 | 25.7 |
| (20–300° C.)/°C. | 23.3 | 25.3 | 26.1 | 23.5 | 27.0 | 31.3 | 28.5 | 27.3 |
| (20–400° C.)/°C. | 26.0 | 28.0 | 28.1 | 25.8 | 29.4 | 34.3 | 31.4 | 30.2 |
| E-modulus (N/mm$^2$) | | | | | | | | |
| DTA | | | | | | | | |
| Peak$_{max}$ (°C.) | 580 & 675 | 560 & 691 | 550 & 630 | 550 & 620 | 582 & 700 | 603 & 705 | 585 & 700 | 530 & 710 |
| Peak height (mm) | 9 & 22 | 9 & 13.5 | 6 & 37 | 6,5 & 47 | 9 & 16 | 10 & 13 | 7 & 15 | 8 & 18 |
| Peak surface (mm$^2$) | 330 & 810 | 300 & 635 | 130 & 995 | 155 & 955 | 225 & 825 | 335 & 745 | 200 & 670 | 350 & 800 |
| Crystal phase content | h-Quartz-MK (54%) + unknown Phase | h-Quartz-MK (46%) + traces unknown Phase + TiO$_2$ | h-Quartz-MK (59%) + unknown Phase | h-Quartz-MK (56%) + Pb— Titanat + unknown Phase | h-Quartz-MK (48%) + unknown Phase + TiO$_2$ | h-Quartz-MK (48%) + TiO$_2$ | h-Quartz-MK (53%) + unknown Phase + TiO$_2$ | h-Quartz-MK (46%) + unknown Phase |
| Strength of borosilicate | | 15.9 | 15.2 | 16.5 | 16.6 | 16.7 | 12.8 | 15.2 |

TABLE 4-continued

| Properties | Properties of Glass Solders of Table 3 | | | | | | | |
|---|---|---|---|---|---|---|---|---|
| | 10 | 11 | 12 | 13 | 14 | 15 | 16 | 17 |
| glass-(Duran) solderings | | 17.1 | 16.5 | 14.2 | 15.2 | 16.7 | 13.8 | 12.0 |
| | | 15.5 | 17.0 | 16.4 | 16.2 | 12.5 | 17.0 | |

Figure 3:
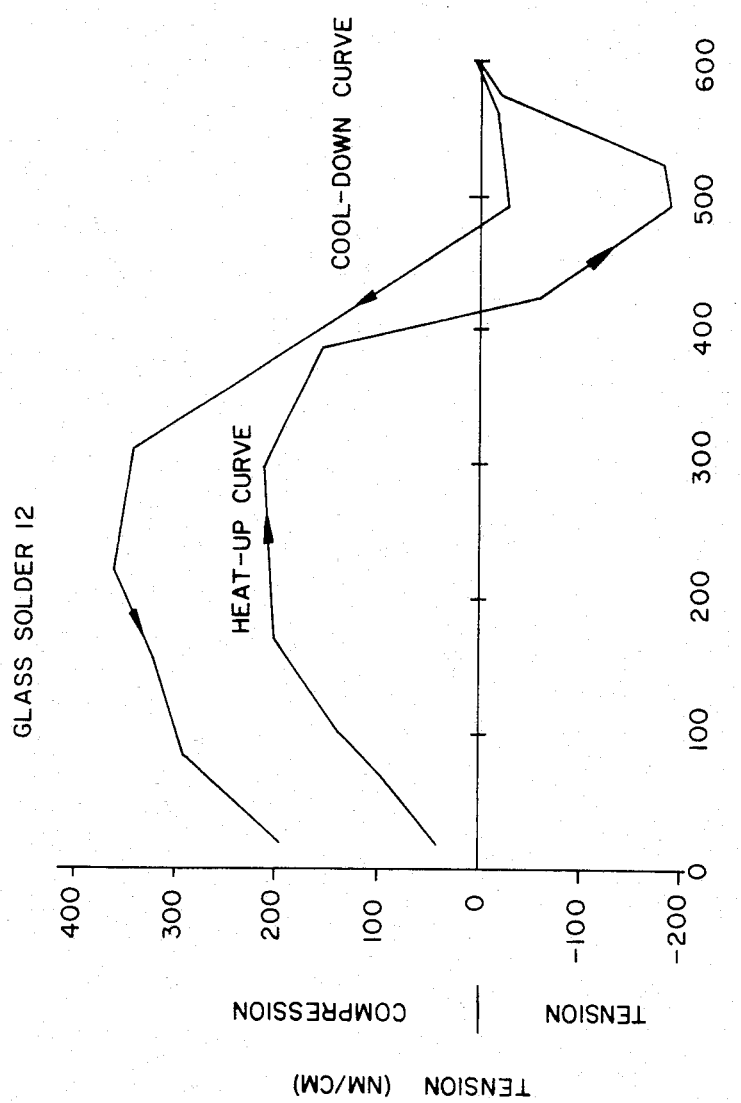
FIG. 3 is a graph showing the fusion tension during heating up and cooling down of a DURAN 50 borosilicate glass sample bonded with glass solder 12.
Figure 4:
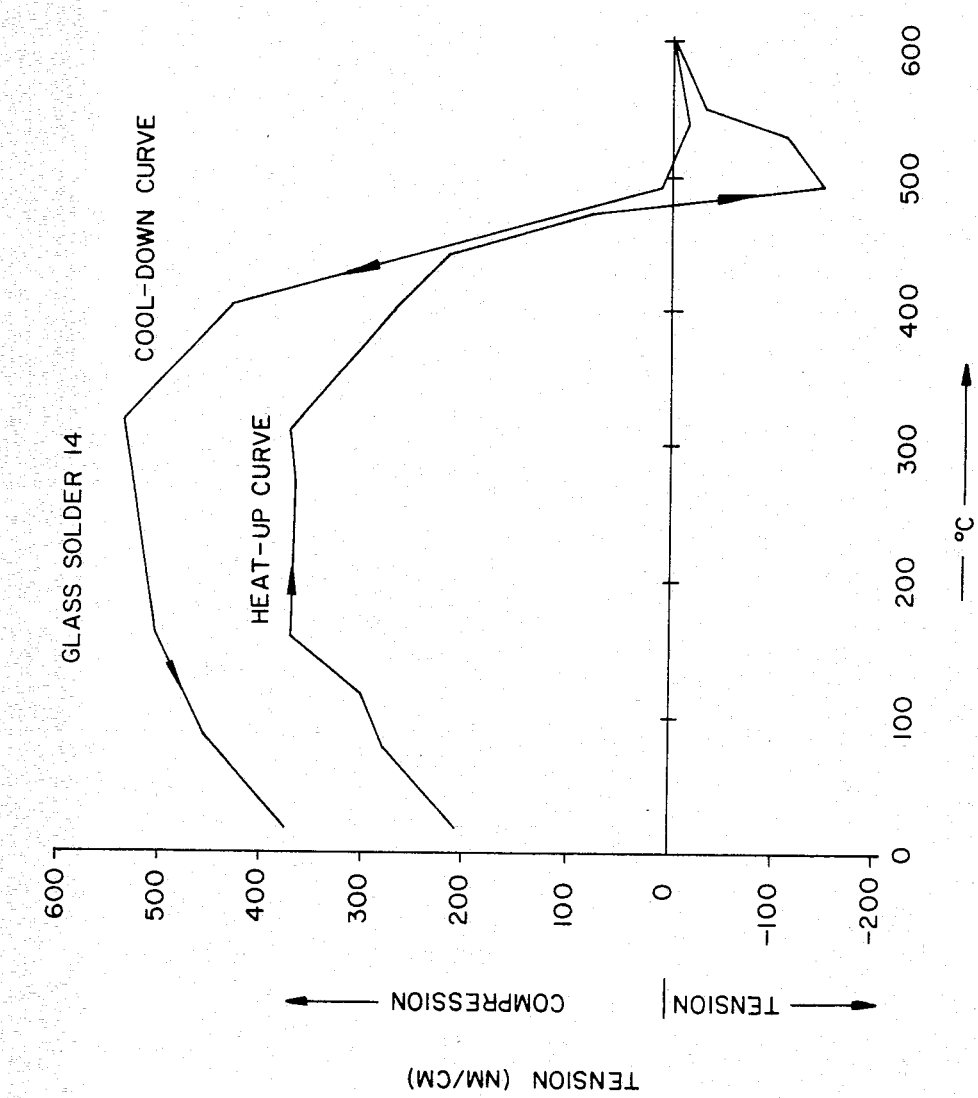
FIG. 4 is a graph showing the fusion tension during heating up and cooling down of a DURAN 50 borosilicate glass sample bonded with glass solder 14.

FIGS. 3 and 4 show the resulting fusion tension in nm/cm on the basis of 5 layer bond samples of glass solders 12, 14 with DURAN 50 borosilicate glass in the median D-50 glass sample during the heating-fusion process of 0°–600° C. and the subsequent cooling to room temperature.

Figure 2B:
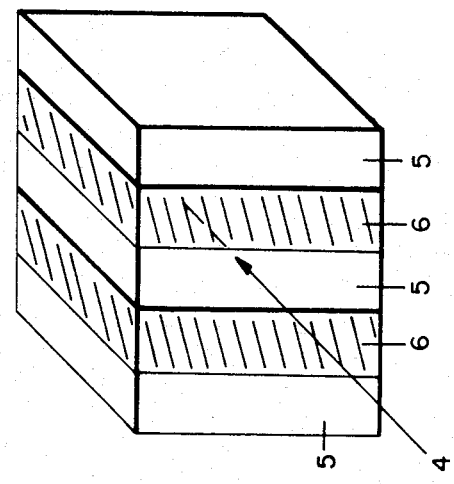
FIGS. 2a and 2b depict test samples discussed in the specification.
Figure 2A:
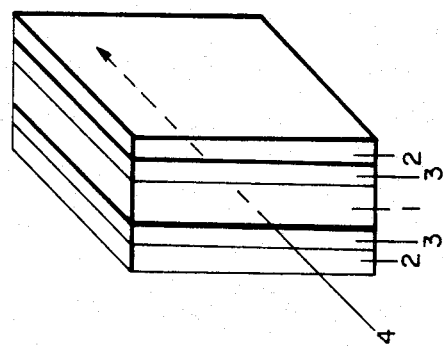

The structure of these fusion samples can be seen from FIG. 2b. Three 1×10×10 mm DURAN platelets (5) are fused over two solder layers (6) of 1×10×10 mm. The arrow (4) in FIG. 2b indicates the direction of measurement.

The two solders used are best suited for soldering of borosilicate glasses of the DURAN 50 type at maximal fusion temperatures of 680° C.

These partially crystallizing glass solders may also be used on stripping films which employ glass solder as the agent which is to be transferred from the film to another object. Stripping films find application in many fields. For example, stripping films for decorating bowls, plates and other chinaware are well known. These stripping films consist of a backing of coated paper upon which a decorative color is applied by means of a water-soluble adhesive. To decorate the china, the film is soaked, the transfer image withdrawn, applied to the china and baked on.

By using a stripping film one may easily transfer a layer of glass solder, crystallizing glass solder or a mixture of such materials to objects which are to be bonded together by means of this glass solder. The glass solder layer thus forms the "decal" of a traditional transfer film.

The glass solder is applied preferably by means of screen printing, offset printing or a combination of screen/offset printing to the backing which generally consists of coated paper. The glass solder layer is of any desired thickness and advantageously has a thickness of from 100 to 250 μm. A preferred glass solder is a partially crystallizing glass solder whose crystal phase consists predominantly of h-quartz mixed crystals and which consists, calculated as oxide weight percent, of the following:

| | |
|---|---|
| $SiO_2$ | 23.0–44.0 Wt. %, |
| $Al_2O_3$ | 20.0–37.0 Wt. %, |
| $Li_2O$ | 5.5–11.0 Wt. %, |
| $B_2O_3$ | 3.0–20.0 Wt. %, |
| PbO | 0–36.0 Wt. %, |
| $Na_2O$ | 0–1.0 Wt. %, |
| $K_2O$ | 0–1.5 Wt. %, |
| F | 0–0.1 Wt. %, |
| $TiO_2$ | 0–4.0 Wt. %, |
| MgO | 0–3.5 Wt. %, |
| CoO | 0–2.0 Wt. %, |
| $B_2O_3$ + PbO + $Na_2O$ + $K_2O$ + F + $TiO_2$ | 8.5–50.0 Wt. %. |

What is claimed is:

1. A partially crystallizing glass solder, exhibiting, after having been sintered at a temperature of greater than 850° C. from glass powder larger than 100 μm, thermal expansion coefficients in the range of 20°–500° C. from −23.5 to 34.3·$10^{-7}$·$K^{-1}$, differential thermoanalysis peak$_{max}$ temperatures (at a heating rate of 2.7 K/min or 6 K/min) lying below 710° C. and crystal phases consisting predominantly of h-quartz mixed crystal phase, and consisting essentially of, calculated as oxide weight percents, the following:

| | |
|---|---|
| $SiO_2$ | 23.0–44.0 Wt. %, |
| $Al_2O_3$ | 20.0–37.0 Wt. %, |
| $Li_2O$ | 5.5–11.0 Wt. %, |
| $B_2O_3$ | 3.0–20.0 Wt. %, |
| PbO | 0–36.0 Wt. %, |
| $Na_2O$ | 0–1.0 Wt. %, |
| $K_2O$ | 0–1.5 Wt. %, |
| F | 0–0.1 Wt. %, |
| $TiO_2$ | 0–4.0 Wt. %, |
| MgO | 0–3.5 Wt. %, |
| CoO | 0–2.0 Wt. %, |
| $B_2O_3$ + PbO + $Na_2O$ + $K_2O$ + F + $TiO_2$ | 8.5–50.0 Wt. %. |

2. The glass solder of claim 1, which exhibit in the sintered crystalline state thermal expansion coefficients in the range of 20°–500° C. from −23.5 to +26·$10^{-7}$·$K^{-1}$, differential thermoanalysis peak$_{max}$ temperatures (at a heating rate of 2.7 K/min) lying below 700° C. and crystal phases consisting predominantly of h-quartz mixed crystal phase, and consist essentially of, calculated as oxide weight percents, the following:

| | |
|---|---|
| $SiO_2$ | 35.0–44.0 Wt. %, |
| $Al_2O_3$ | 30.0–37.0 Wt. %, |
| $Li_2O$ | 8.5–11.0 Wt. %, |
| $B_2O_3$ | 3.0–10.0 Wt. %, |
| PbO | 0–15.0 Wt. %, |
| $Na_2O$ | 0–1.0 Wt. %, |
| $K_2O$ | 0–0.65 Wt. %, |
| F | 0–0.1 Wt. %, |
| $TiO_2$ | 0–4.0 Wt. %, |
| MgO | 0–2.0 Wt. %, |
| $B_2O_3$ + PbO + $Na_2O$ + $K_2O$ + F + $TiO_2$ | 8.5–25.0 Wt. %. |

3. The glass solder of claim 1, which exhibits in the sintered crystalline state a progression of the thermal expansion coefficient in the range of 20°–500° C. from −5.3 over −0.7 to +13.3·$10^{-7}$·$K^{-1}$, a differential thermoanalysis peak$_{max}$ temperature lying at 687° C., the crystalline phase consisting predominantly of h-quartz mixed crystal, which consists essentially of, calculated as oxide parts by weight, the following:

| | | |
|---|---|---|
| $SiO_2$ | 43.71 | Parts by weight, |
| $Al_2O_3$ | 35.43 | Parts by weight, |
| $Li_2O$ | 10.17 | Parts by weight, |
| $B_2O_3$ | 8.95 | Parts by weight, |
| PbO | 1.60 | Parts by weight, |
| $Na_2O$ | 0.04 | Parts by weight, |
| F | 0.10 | Parts by weight, |
| $TiO_2$ | 4.00 | Parts by weight, |
| Total | 104.00 | Parts by weight. |

4. The glass solder of claim 1, which exhibits in the sintered crystalline state at a maximum of 680° C. thermal expansion coefficients in the range of 20°–400° C. from 11.9 to 34.3·$10^{-7}$·$K^{-1}$, differential thermoanalysis peak$_{max}$ temperatures (at a heating rate of 6 K/min) lying below 710° C. and a crystalline phase consisting predominantly of h-quartz mixed crystal phase together with somewhat lesser proportions of an unknown second crystalline phase and consists essentially of, calculated as oxide weight percents, the following:

| | |
|---|---|
| SiO$_2$ | 23.00–29.00 Wt. %, |
| Al$_2$O$_3$ | 20.00–25.00 Wt. %, |
| Li$_2$O | 5.90–7.00 Wt. %, |
| B$_2$O$_3$ | 10.00–20.00 Wt. %, |
| PbO | 12.50–36.00 Wt. %, |
| K$_2$O | 0–1.50 Wt. %, |
| TiO$_2$ | 4.00 Wt. %, |
| MgO | 0–3.50 Wt. %, |
| CoO | 0–2.00 Wt. %, |
| B$_2$O$_3$ + PbO + K$_2$O + F + TiO$_2$ | 40.00–50.00 Wt. %. |

5. The glass solder of claim 1, exhibiting in the sintered crystalline state a change of the thermal expansion coefficient in the range of 20°–400° C. from 18.9 to 29.4·$10^{-7}$·$K^{-1}$, the fusion tension in a 5-layer soldering test corresponding to the curve progression shown in FIG. 4, the tensile strength of such a soldering being >15N/mm$^2$ and consists essentially of, calculated as oxide weight percents, the following:

| | |
|---|---|
| SiO$_2$ | 28.70 Wt. %, |
| Al$_2$O$_3$ | 24.30 Wt. %, |
| Li$_2$O | 7.00 Wt. %, |
| B$_2$O$_3$ | 20.00 Wt. %, |
| PbO | 14.00 Wt. %, |
| TiO$_2$ | 4.00 Wt. %, |
| MgO | 2.00 Wt. %. |

* * * * *